(12) United States Patent
Degenstein et al.

(10) Patent No.: US 8,523,206 B2
(45) Date of Patent: Sep. 3, 2013

(54) MOTOR VEHICLE

(75) Inventors: Thomas Degenstein, Mainz (DE); Lutz Uhlenbruch, Herbstein (DE)

(73) Assignee: Gm Global Technology Operations LLC, Detroit, MI (US)

( * ) Notice: Subject to any disclaimer, the term of this patent is extended or adjusted under 35 U.S.C. 154(b) by 225 days.

(21) Appl. No.: 13/006,175

(22) Filed: Jan. 13, 2011

(65) Prior Publication Data

US 2011/0169239 A1    Jul. 14, 2011

(30) Foreign Application Priority Data

Jan. 14, 2010  (DE) .......................... 10 2010 004 540

(51) Int. Cl.
*B62D 3/12* (2006.01)
*B62D 5/22* (2006.01)

(52) U.S. Cl.
USPC ............. 280/93.515; 180/428; 280/93.514; 280/93.513

(58) Field of Classification Search
USPC .......... 280/93.515, 93.513, 93.514; 180/428, 180/400, 311; 74/498
See application file for complete search history.

(56) References Cited

U.S. PATENT DOCUMENTS

| | | | | |
|---|---|---|---|---|
| 3,593,593 A | * | 7/1971 | Bradshaw | 74/498 |
| 3,869,139 A | * | 3/1975 | Gage | 280/93.515 |
| 3,958,462 A | * | 5/1976 | Matschinsky et al. | 74/498 |
| 4,531,426 A | * | 7/1985 | Iijima | 74/498 |
| 5,286,014 A | * | 2/1994 | Chakko | 267/293 |
| 5,871,319 A | * | 2/1999 | Schneider | 411/107 |
| 6,102,416 A | * | 8/2000 | Harkrader et al. | 280/93.515 |
| 6,164,405 A | * | 12/2000 | Sakata | 180/400 |
| 6,189,902 B1 | | 2/2001 | Lenzen, Jr. et al. | |
| 6,554,304 B2 | * | 4/2003 | Lee | 280/93.515 |
| 6,880,842 B2 | * | 4/2005 | Zhang et al. | 280/93.515 |
| 7,322,588 B2 | * | 1/2008 | Vandaele | 280/93.515 |
| 7,469,912 B2 | * | 12/2008 | Maruyama et al. | 280/93.515 |

FOREIGN PATENT DOCUMENTS

| | | |
|---|---|---|
| GB | 2148807 A | 6/1985 |
| JP | 2002178936 A | 6/2002 |
| JP | 2002302052 A | 10/2002 |

OTHER PUBLICATIONS

German Search Report dated Dec. 3, 2010, issued in Application No. 10 2010 004 540.3.

* cited by examiner

*Primary Examiner* — Joseph Rocca
*Assistant Examiner* — George Spisich
(74) *Attorney, Agent, or Firm* — Ingrassia Fisher & Lorenz, P.C.

(57) ABSTRACT

A steering gear of a motor vehicle is fastened to a chassis via several bearing points, each of which includes, but is not limited to bolt penetrating eyes of the chassis and the steering gear and an elastic sleeve. The elastic sleeve of at least a first of the bearing points is accommodated in the eye of the chassis.

10 Claims, 2 Drawing Sheets

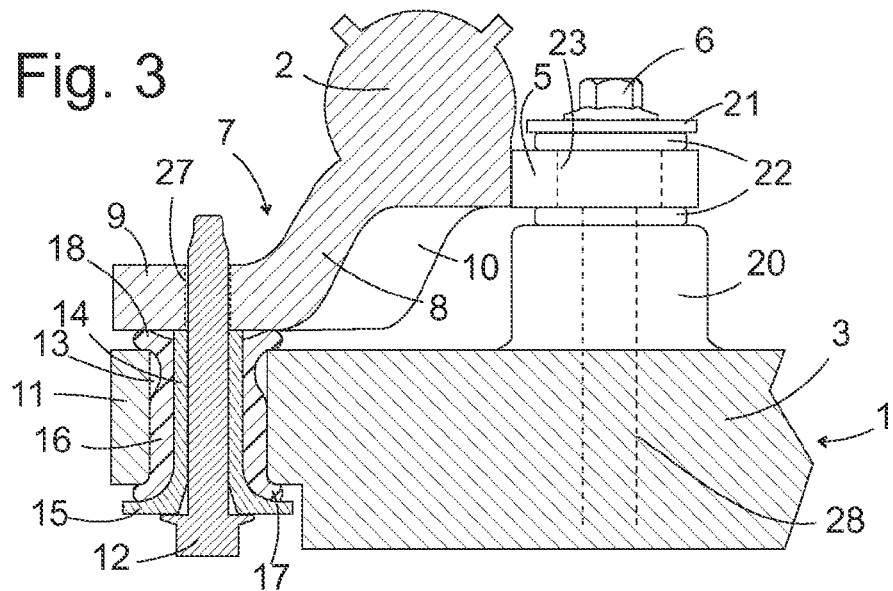
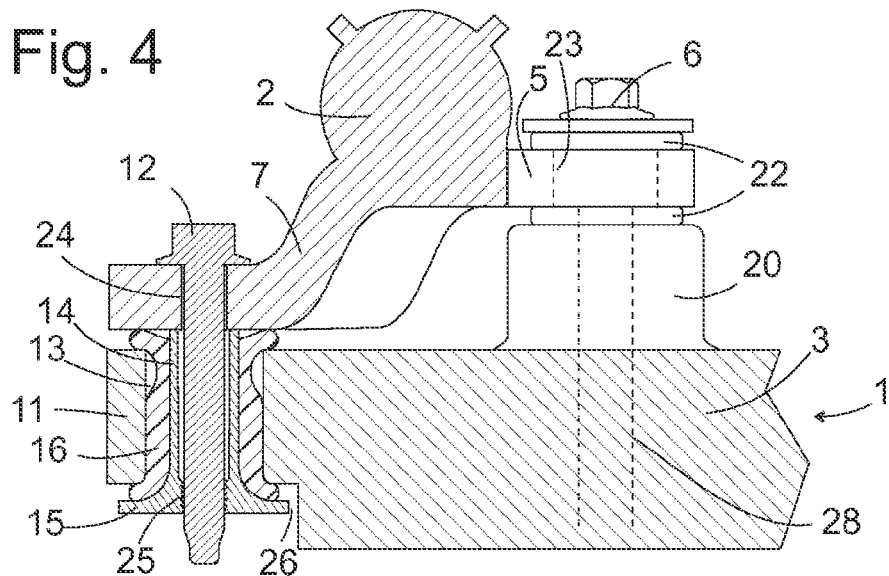
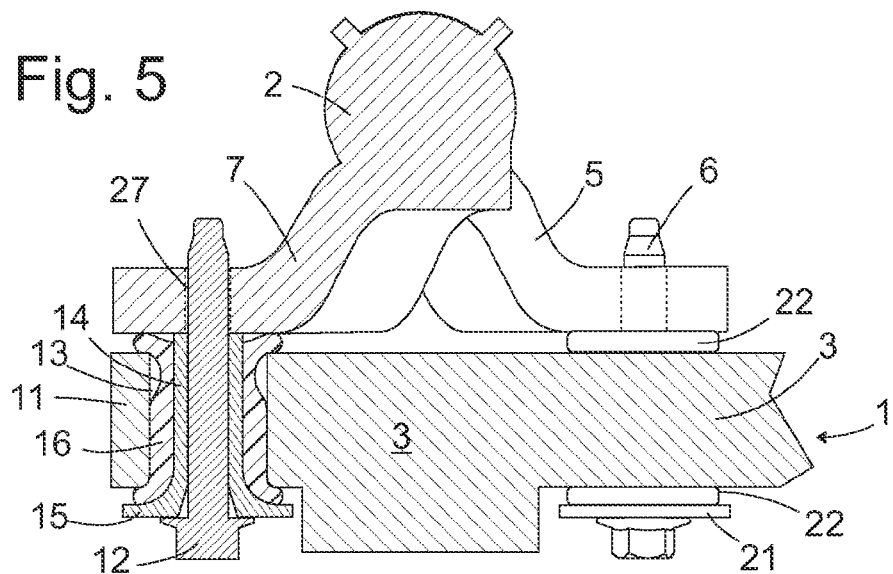

MOTOR VEHICLE

CROSS-REFERENCE TO RELATED APPLICATION

This application claims priority to German Patent Application No. 102010004540.3, filed Jan. 14, 2010, which is incorporated herein by reference in its entirety.

TECHNICAL FIELD

The technical field relates to the connecting of a steering gear to a chassis of a motor vehicle.

BACKGROUND

Steering gears for motor vehicle are known in various types. A widespread type comprises a housing stretched along in vehicle transverse direction, in which a rack is in engagement with a pinion of the steering axle and is laterally displaceable corresponding to the rotations of the steering wheel in order to transmit the steering wheel rotation to the front wheels, which are pivotably fastened about a substantially vertical axis on a chassis. In order to be able to exert the steering force on the wheels the housing of the steering gear has to be fastened to the chassis; on the other hand the fastening should not be completely rigid so that vibrations of the chassis are not transmitted to the steering wheel and the body. Usually, two or more feet, which stand away from the steering gear in vehicle longitudinal direction and accommodate an elastic bearing sleeve through which a bolt anchored to the chassis in a fixed manner, extends, usually serve for the fastening of the steering gear. In most cases, only two such feet are present which extend from the steering gear in vehicle longitudinal direction to the back. Feet and bolts must be strong design in order to be able to withstand the loads that occur in operation.

The lever or tilting moments to which the anchorage of the steering gear is exposed and the resulting movements of the steering gear could be substantially reduced with the help of at least one additional foot reaching out from the steering gear in forward direction. Accommodating such a foot however poses substantial difficulties since the space above and in front of the steering gear is occupied by engine block, shift transmission, exhaust, driveshaft or other installations of the engine compartment.

In view of the foregoing, at least one object is to create a motor vehicle that makes possible space-saving, structurally favorable connection of the steering gear to the chassis. In addition, other objects, desirable features and characteristics will become apparent from the subsequent detailed description, and the appended claims, taken in conjunction with the accompanying drawings and this background.

SUMMARY

A motor vehicle is provided with a chassis and a steering gear being fastened to the chassis via several bearing points each of which comprises a bolt penetrating eyes of the chassis and the steering gear and an elastic sleeve, and the elastic sleeve of at least one first of the bearing points is accommodated in the eye of the chassis. Since, consequently, the diameter of an eye of the foot merely needs to be adequate for accommodating the bolt, but not the sleeve, the dimensions of the foot altogether can be reduced, which expands the possibilities of accommodating the feet.

In particular, it is more easily possible as a result to arrange the first bearing point in driving direction of the vehicle offset against a second and third of the bearing points, preferentially in such a manner that the first bearing point is arranged at a in driving direction of the vehicle front side and second and third bearing points are arranged on a rear side of the steering gear. The first bearing point can also be arranged on the rear side and conversely the second and third bearing point can also be arranged on the front side. This arrangement leads to a reduced lever moment load of each individual foot, which in turn creates the possibility of reducing the material thickness of the feet which in turn makes it easier to find a place of installation for the feet that is favorable under structural and dynamic aspects.

In order to avoid conflict with other installations of the engine compartment it is additionally advantageous if the first bearing point is arranged offset in the vertical against the second and third bearing point, preferentially below the second and third bearing point. Such vertical offset can also be useful in order to establish a secure spacing between the elastic sleeve of the first bearing point and hot components, such as the exhaust for instance. More preferably, the first bearing point can be formed on a foot of the steering gear offset in downward direction.

If at least one of the eyes of the steering gear has an internal thread into which the bolt is screwed, no space for a screw head, a nut or the like has to be kept available above the foot, which in turn reduces the space requirement of the steering gear fastening. The omission of an otherwise required nut and a corresponding reduction in length of the bolt additionally makes possible a minor weight saving and consequently results in the reduction of the number of parts, facilitates assembly and possibly also the costs.

In order to improve the load capacity of the fastening the elastic sleeve is preferentially reinforced in the interior by a stiff sleeve. This stiff sleeve can be clamped between a thickened portion of the bolt such as a head or, if present, a nut and the steering gear in order to prevent excessive deformation of the elastic sleeve through compression between the thickened portion and the steering gear and resultant damaging of the elastic sleeve.

The stiff sleeve is preferentially provided with a flange at an end facing away from the steering gear. This flange makes it more difficult for its parts to gradually fall out of the eye when the elastic sleeve becomes brittle due to age. If the flange protrudes over the edges of the eye this additionally establishes a positive connection between the steering gear and the chassis so that even complete destruction of the elastic sleeve cannot result in that the steering gear becomes detached from the chassis. Instead of the foot, the sleeve can also have an internal thread into which the bolt is screwed.

BRIEF DESCRIPTION OF THE DRAWINGS

The present invention will hereinafter be described in conjunction with the following drawing figures, wherein like numerals denote like elements, and:

FIG. 3 is a schematic partial cross section through the steering gear and the chassis according to a first embodiment;

FIG. 4 is a section analog to FIG. 3 according to a second embodiment; and FIG. 5 is a section analog to FIG. 3 according to a third embodiment.

DETAILED DESCRIPTION

The following detailed description is merely exemplary in nature and is not intended to limit application and uses. Furthermore, there is no intention to be bound by any theory presented in the preceding background or the following detailed description.

Figure 1:
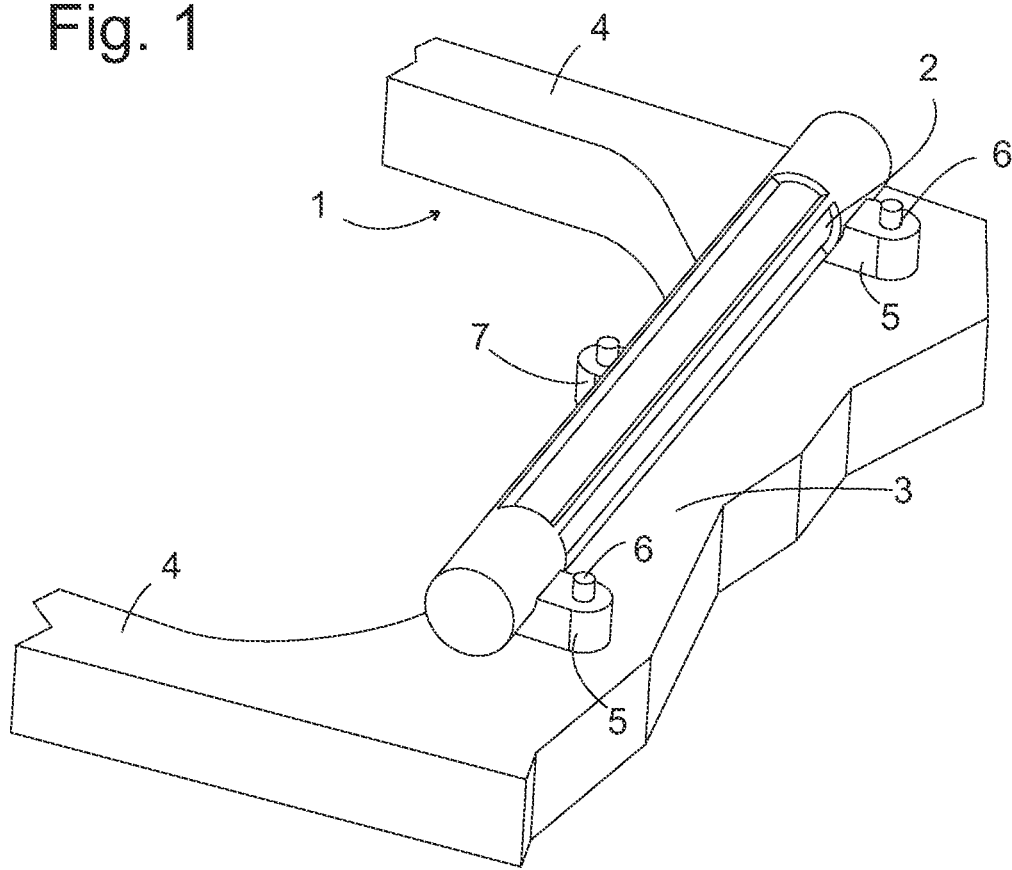
FIG. 1 is a schematic perspective view of a part of a chassis of a motor vehicle with a steering gear mounted thereto.

FIG. 1 is a partial perspective view of an auxiliary frame 1, which forms a part of a motor vehicle chassis, and a steering gear 2 mounted to the auxiliary frame 1. The auxiliary frame 1 substantially has the shape of a quadrangular frame, which can be cast in one piece or be joined together of several elements, more preferably welded. A with respect to the driving direction of the motor vehicle rear region of the auxiliary frame 1 having a transverse beam and parts of longitudinal members 4 extending from the ends of the cross beam 3 forward, is shown in the view of FIG. 1. The auxiliary frame 1 is connected to a longitudinal member construction not shown in FIG. 1, which extends over the entire length of the vehicle and indirectly or directly carries body parts such as fenders, doors, etc., visible from the outside. The connection between longitudinal member construction and auxiliary frame can be rigid or capable of oscillating in a dampened manner. The auxiliary frame 1 forms one of several bearings carrying engine and transmission of the motor vehicle and suspensions for the front wheel axles are provided on the longitudinal members 4 outside its region shown in FIG. 1.

A track rod moveable in longitudinal direction of the steering gear 2 or in transverse direction of the vehicle in a manner known per se coupling a rack of the steering gear to the front wheels and a steering spindle connected to the steering wheel and meshing with the rack have been omitted in FIG. 1 for the sake of simplicity. The substantially long stretched cylindrical housing of the steering gear 2 at its left and right end carries a foot 5 each projecting against the driving direction, which foot is fastened to the auxiliary frame 1 with the help of screws 6. A third foot 7 is arranged on the steering gear 2 approximately in the middle and projects in forward direction.

Figure 2:
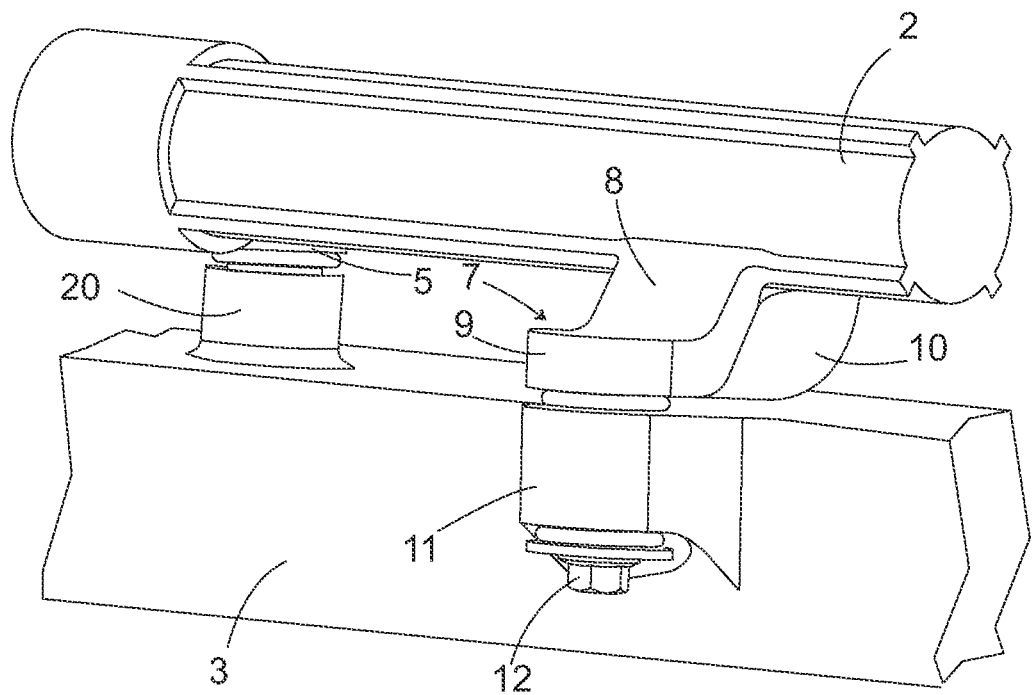
FIG. 2 is a detail of the chassis and the steering gear seen from another perspective.

The detail view of FIG. 2 each shows a piece of the steering gear 2 and the cross beam 3, seen obliquely from the front. The foot 7 based on the housing of the steering gear 2 is offset downwards, more precisely it comprises a root portion 8 obliquely dropping in forward direction and a tongue 9 adjoining the root portion substantially extending horizontally. A vertical stiffening rib 10 is formed between a back side of the root portion 8 facing away from the beholder in FIG. 2 and the housing of the steering gear 2. The top of the tongue is located lower than the substantially cylindrical steering gear 2.

On the cross beam 3 a unitary projection 11 projecting into the opening of the auxiliary frame 1 is formed, which is substantially identical in area to the foot 7. The foot 7 is fastened to the projection 11 with the help of a screw 12 which extends from below through an eye of the projection 11 and engages in an eye of the tongue 9 provided with an internal thread 27 (see FIG. 3 for instance).

FIG. 3 shows these facts more detailed in a cross section. Within the eye 13 of the projection 11 the screw 12 is surrounded by a metal sleeve 14 which at its end facing away from the foot 7 carries a circumferential flange. In that the head of the screw 12 presses against the flange 15 the opposite end of the sleeve 14 is kept in contact with the foot 7 and screw 12 and sleeve 14 are immoveable with respect to the foot 7.

The metal sleeve 14 is surrounded by an elastic sleeve 16 of rubber, which on both ends of the eye 13 is radially widened so that end regions 17, 18 of the sleeve 16 are clamped between the flange 15 and the bottom of the projection 11 and between the top of the projection 11 and the foot 7 respectively. The diameter of the flange 15 is greater than the diameter of the eye 13. The elastic sleeve 16 allows dampened oscillatory movement of the steering gear 2 with respect to the auxiliary frame 1.

The cross beam 3 is provided with two studs 20 standing away upwards, in which a threaded bore 28 for anchoring one of the screws 6 each is formed, which is indicated in the figure by an interrupted line. In contrast with screw 12, the screws 6 are thus fixed on the auxiliary frame 1 and a rigid metal sleeve 21 and an elastic sleeve 22 surrounding the metal sleeve 21 penetrate an eye 23 of the foot 5, which is indicated in interrupted line in FIG. 3, together with the screw 6. The sleeves 21, 22 differ from the sleeves 14, 16 with this configuration merely in their length. Obviously, sleeves 21, 22, 14, 16 of the same length could also be used if, deviating from the representation of FIG. 3, the material thickness of the projection 11 and the feet 5 were identical.

In order to simplify the mounting of the steering gear 2 it is practical if all screws 6 and 12 used for its fastening can be attached from a same side. A second configuration, where this is possible, is shown in FIG. 4 in a section through the foot 7 and the projection 11 that is analog to that of FIG. 3. The shape of the foot 7 is the same as in the case of FIG. 3 except that the foot does not have an internal thread, but that the screw 12 instead extends freely from the top through an eye 24 of the foot 7. An internal thread 25 in which the screw 12 finds hold is formed at the end of the metal sleeve 14 facing away from the foot 7. In order to be able to screw the screw 12 into the internal thread 25 of the sleeve 14 in a fixed manner, the flange 15 can have a cross section other than round for example hexagonal, which allows the placing of a screwing tool or a gap 26 between a linear outer marginal segment of the flange 15 and the cross beam 3 is so narrow that it does not allow any rotation of the sleeve 16 together with the screw 12.

According to a third embodiment shown in FIG. 5, all feet, both the outer feet 5 directed to the back as well as the foot 7 projecting forward are offset in the same manner and fixed with screws 6 and 12 respectively penetrating the cross beam 3 and its projection 11 respectively from the bottom.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
   a chassis including a plurality of eyes;
   a steering gear comprising at least three feet arranged to couple the steering gear to the chassis, wherein a first foot of the at least three feet is arranged on a first side of the steering gear and a second foot and third foot of the at least three feet are arranged on a second side of the steering gear, and the first foot is offset from the second foot and third foot in a horizontal direction and a vertical direction, wherein the horizontal direction is substantially perpendicular to the vertical direction;

a bolt for each of the at least three feet penetrating the plurality of eyes and the steering gear; and an elastic sleeve that is penetrated by the bolt and is accommodated in at least one of the plurality of eyes of the chassis.

2. The motor vehicle according to claim 1, wherein the first foot is arranged in a driving direction of the motor vehicle.

3. The motor vehicle according to claim 1, wherein the first foot is arranged in a driving direction of a front side of the steering gear and the second foot and the third foot are arranged on a back side of the steering gear.

4. The motor vehicle according to claim 1, wherein the first foot is arrange on a back side of the steering gear and the second and third feet are arranged on a front side of the steering gear.

5. The motor vehicle according claim 1, further comprising a bearing point formed each of the at least three feet.

6. The motor vehicle according to claim 1, wherein at least one of the plurality of eyes comprises an internal thread into which the bolt is screwed.

7. The motor vehicle according to claim 1, wherein the elastic sleeve is reinforced by a stiff sleeve.

8. The motor vehicle according to claim 7, wherein the stiff sleeve is clamped between a thickened portion of the bolt and the steering gear.

9. The motor vehicle according to claim 7, wherein the stiff sleeve at an end facing away from the steering gear carries a flange.

10. The motor vehicle according to claim 9, wherein the stiff sleeve has an internal thread into which the bolt is screwed.

* * * * *